J. DAVENPORT.
Carriage-Spring.

No. 35,085.

Patented Apr. 29, 1862.

Witnesses:
Gustavus Dieterich
Edwin S. Jacob

Inventor:
Joseph Davenport
by
Mason, Fenwick & Lawrence
Attys.

UNITED STATES PATENT OFFICE.

JOSEPH DAVENPORT, OF MASSILLON, OHIO.

IMPROVEMENT IN SPRINGS FOR VEHICLES.

Specification forming part of Letters Patent No. 35,085, dated April 29, 1862.

*To all whom it may concern:*

Be it known that I, JOSEPH DAVENPORT, of Massillon, Stark county, State of Ohio, have invented a new and useful Improvement in Vehicle-Springs; and I do hereby declare that the following is a full, clear, and exact description of the same, reference being had to the accompanying drawings, forming part of this specification, in which—

Figure 1:
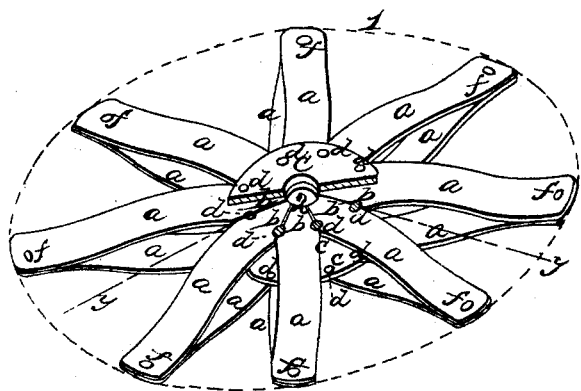
Figure 2:
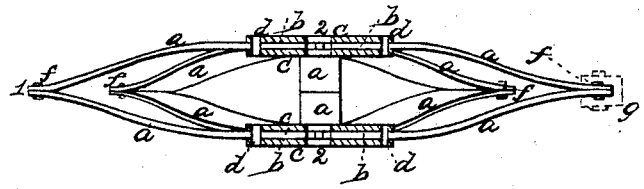

Figure 1 is a perspective view of my improved spring, one-half of one of the clamping-plates being cut away. Fig. 2 is a vertical section of the same.

The same letters of reference in the several figures indicate corresponding parts.

My invention relates to an improvement in solid slitted-disk springs and to radiating C-springs.

My spring is made in form of a star, and may consist of any desired number of pairs of leaves arranged around or about a common axis or center and opposite one another. The leaves $a$ are of cyma reversa form, and at their inner ends, $b$, are brought down in width to a V or similar taper shape. Their outer ends are square. These leaves are arranged radially within a given circle, 1, so that their V ends adjoin and inclose a smaller circle, 2, and their outer ends touch the circle 2. Above and below the V ends of the leaves circular disks $c$ $c$, with a hole through their center, are placed, and the leaves and disks are clamped or bolted together by bolts $d$ $d$, which pass through the under disk, between the adjoining edges of the V ends of the leaves and through the upper disk, as shown.

To each spring there are two structures similar to the one just described, and these are united together by inverting one and placing it under the other, so that the leaves of it lie under or in line with the leaves of the same, and then riveting the outer ends of the upper and lower leaves together, or clamping them together, as shown in the drawings at $f$ $g$.

The spring thus formed gives great elasticity and support in a very small compass, and in case any one of the leaves should break or give out it affords every facility for removing such leaf and substituting a perfect one.

To use this spring it is better to provide a short stop on the upper and lower timbers, between which it is placed, so that said stops will enter the central holes in the clamping-plates and thus keep the spring in place. Other modes of confining it might be adopted.

Having thus described my invention and set forth its advantages, what I claim as new, and desire to secure by Letters Patent, is—

A vehicle-spring made up of pairs of short sections of leaves $a$ $a$, arranged around a common center and radiating therefrom, and clamped between disks at their inner ends, and riveted or clamped together at their outer ends, all substantially in the manner and for the purposes herein described.

Witness my hand, in the matter of my application for patent on springs for vehicles, this 7th day of April, A. D. 1862.

JOSEPH DAVENPORT.

Witnesses:
GUSTAVUS DIETERICH,
E. S. JACOB.